United States Patent
Hujber

(10) Patent No.: US 6,956,822 B2
(45) Date of Patent: Oct. 18, 2005

(54) RESTORATION MANAGEMENT SYSTEM AND METHOD IN A MPLS NETWORK

(75) Inventor: Frank Hujber, Mercerville, NJ (US)

(73) Assignee: Alphion Corporation, Eatontown, NJ (US)

(*) Notice: Subject to any disclaimer, the term of this patent is extended or adjusted under 35 U.S.C. 154(b) by 798 days.

(21) Appl. No.: 09/951,000

(22) Filed: Sep. 13, 2001

(65) Prior Publication Data

US 2002/0049856 A1 Apr. 25, 2002

Related U.S. Application Data

(60) Provisional application No. 60/238,362, filed on Oct. 6, 2000.

(51) Int. Cl.[7] .............................................. H04L 12/26
(52) U.S. Cl. ...................... 370/238; 370/389; 370/390; 370/392; 370/395.5; 370/216; 370/254; 370/400; 370/401; 370/469; 709/238; 709/239; 709/242; 709/245; 709/250
(58) Field of Search ................................ 370/216, 254, 370/389, 390, 392, 395.5, 400, 401, 469; 370/239; 709/238, 239, 242, 245, 250

(56) References Cited

U.S. PATENT DOCUMENTS

| | | | |
|---|---|---|---|
| 5,991,300 A | * | 11/1999 | Tappan ........................ 370/392 |
| 6,751,746 B1 | * | 6/2004 | Jain et al. ........................ 714/4 |
| 2002/0093954 A1 | * | 7/2002 | Weil et al. .................. 370/389 |
| 2002/0126653 A1 | * | 9/2002 | Vasarainen .................. 370/352 |

OTHER PUBLICATIONS

MPLS Label Stack Encoding (Network Working Group; Internet Engineering Task Force; RFC 3032): Rosen et al..; Jan. 2001, work in progress Jul. 2000.*
IETF Multiprotocol Label Switching Architecture: Le Faucheur, Francois: Jun. 1998.*
IP Router Alert Option (Network Working Group; Internet Engineering Task Force; RFC 2113): Katz, Dave: Feb. 1997.*

* cited by examiner

Primary Examiner—Frank Duong
Assistant Examiner—Jay P. Patel
(74) Attorney, Agent, or Firm—Kaplan Gilman Gibson & Dernier, L.L.P.

(57) ABSTRACT

In a novel restoration management method and system, the restoration messages are treated in two ways simultaneously so as to avoid delay in transmitting to a next node. In particular, a router alert bit is attached to each restoration message at an edge of the restoration network, which is read by a Label Switched Router so as to identify the restoration message as such. Then the restoration message is duplicated. The original one is directly forwarded to the next node through the shim player so as to avoid any delay. The duplicated one is sent to the application layer at the node for being processed there.

12 Claims, 1 Drawing Sheet

RESTORATION MANAGEMENT SYSTEM AND METHOD IN A MPLS NETWORK

RELATED APPLICATION

This application claims priority of U.S. Provisional Patent Application Ser. No. 60/238,362, filed on Oct. 6, 2000.

TECHNICAL FIELD

This invention relates to Multi-Protocol Label Switched (MPLS) networks, and more particularly, to a restoration management system and method employed in a MPLS network by which restoration messaging in the MPLS network can be accelerated.

BACKGROUND OF THE INVENTION

Multi-Protocol Label Switching (MPLS) offers a significantly faster transmission by its concept of "route at the edge and switch in the core" and is widely adopted in many networks, including optical networks. As a datastream enters the edge of the network, the ingress Label Switch Router (LSR) reads the full address of the first data packet and attaches a small label in the packet header, which precedes the packet. A LSR at an intermediate node only needs to read this much abbreviated address in the small label so as to forward the packet to the next node. Accordingly, which is much faster than if the packets have to traverse to the application layer for examining the full IP address. In the MPLS network, the packets go through a shim layer at each intermediate node and are forwarded to the next node without traversing to the application layer of the nodes (as shown in FIG. 1(a)).

For restoration purposes, dual Label Switched Paths (LSPs) are established for a given connection, and one is identified as the primary LSP while the other as the secondary LSP. In the case where the primary LSP fails to deliver the message, possibly because it follows a failed path, the restoration mechanism operates to repeat the signaling message over the secondary path. On the secondary path, the intermediate nodes need to take action in support of establishing the restoration connection. Thus, contact needs to be made with their application layers directly through the use of a TCP/IP session so as to deliver instructions to the intermediate nodes. Conventionally, instead of traversing through the shim layer at nodes in the primary LSP, the message goes up the stack to the application layer at each intermediate node on the secondary LSP, being processed and reformatted there, and then goes down the stack to leave for the next node, such as shown in FIG. 1(b). Thus, a delay occurs due to the fact that the restoration message has to traverse the stack in both ways, and that the restoration message always has to wait for the processing at the application layer before being forwarded to the next node.

Therefore, there exists a need of the restoration management system in which the restoration message may be transmitted along the restoration path with less delay.

SUMMARY OF THE INVENTION

The present invention provides a novel restoration management method and system in which the restoration messages are treated in two ways simultaneously so as to avoid delay in transmitting to a next node. In particular, a router alert bit is attached to each restoration message at the edge of the restoration network, which is read by a Label Switched Router at the intermediate nodes so as to identify the restoration message as such. Then the restoration message is duplicated. One copy of the restoration message is directly forwarded to the next node through the shim player so as to avoid any delay. The other one is sent to the application layer at the node for being processed there.

Preferably, the router alert bit used for identifying the restoration message is a special value of a label in the stack of the packet representing the restoration message. Preferably the special value is 1, which is placed at the top of the stack of the packet.

BRIEF DESCRIPTION OF THE DRAWINGS

The above and further features and advantages of the invention will be clearer upon reading the detailed description of the preferred embodiment of the present invention with reference to the accompanying drawings in which.

DETAILED DESCRIPTION OF THE PREFERRED EMBODIMENT

Figure 2:
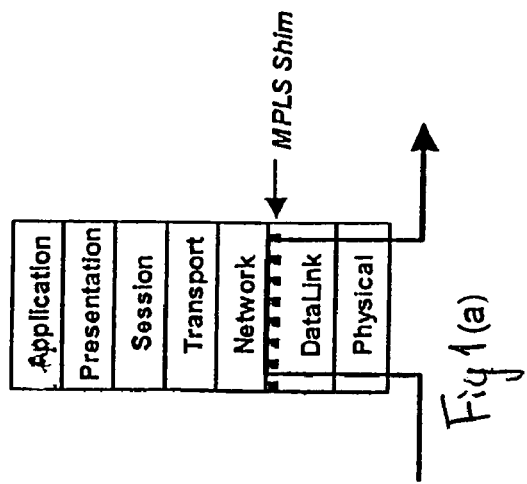
FIG. 2 illustrates the dual-action of the restoration message according to the present invention.
Figure 1B:
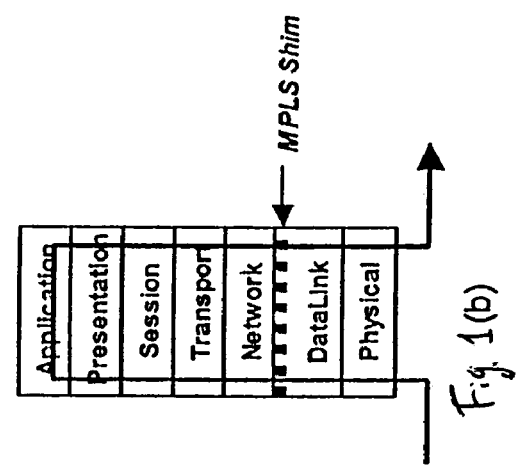
FIG. 1(b) illustrates that a restoration message traverses up to the application layer and goes down the stack to leave the node.
Figure 1A:
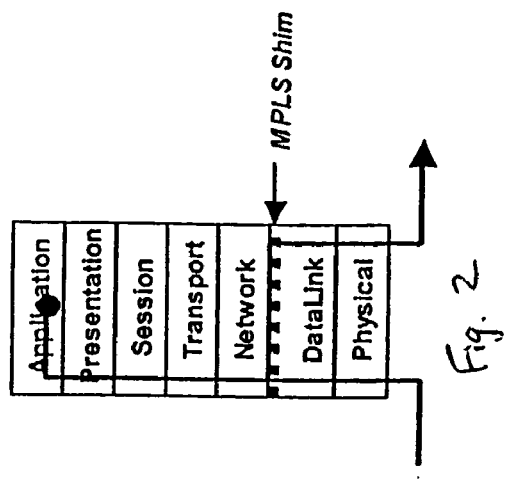
FIG. 1(a) illustrates that a message traverses via a shim layer in a MPLS network.

As shown in FIG. 2, according to the novel restoration management mechanism of the present invention, the restoration message is duplicated at the switch of the intermediate node. One is forwarded further through the MPLS shim layer to the next node without delay, the other is sent upward the stack to the application layer for processing. The restoration message does not need to wait for application layer processing before being forwarded to the next node, as was in the traditional system shown in FIG. 1(b), and thus the restoration messaging is accelerated.

In particular, at the edge of the network, a router alert bit is attached, preferably by a Label Switched Router (LSR), to the restoration message to identify it as such, which can be read by a LSR at each intermediate node. Preferably the router alert bit is a special value in a label in the packets representing the restoration message. In a preferred embodiment, the special value is 1 and it is placed at the top of the stack of the packets.

In operation, upon receiving a packet representing the restoration message at an intermediate node, the LSR at the node reads the label value "1" at the top of the stack in the packet, and thus identifies it as a restoration message that needs to be specially treated according to the invention. The message is duplicated, preferably at the shim layer. The original of the message goes further through the shim layer to the next node according to the next label in the stack, and the copy of the message is sent to the local queue at the application layer of the node for further processing as required.

At the application layer, when the local queue receives the packet, it first searches to see if the router alert bit in the IP header is set. If so, it processes the packet according to standards. If not, it examines the data portion of the message to see if it is a "dual action" message. If so, the message is turned over to the specific applications for processing. If not, no further action is taken and the packet is discarded.

When the next LSR in the next work encounters such a specially labeled packet, it processes it in the same way. That is, it is duplicated and the copy of it is sent to the application layer, while the original is directly forwarded to a next node through the shim layer.

The above has described a preferred embodiment in detail. However, it shall be appreciated that, without departing the spirit of the invention, various changes and modifications are apparent to a person skilled in the art. For example, the original of the restoration message may be sent to the application layer for processing, while the duplicated restoration message is forwarded to the next node through the shim layer. Thus, the scope of the invention is solely intended to be limited in the accompanying claims.

What is claimed is:

1. A method of restoration management in a Multi-Protocol Label Switching network, comprising the steps of:
   a. attaching, at an edge of said network, a router alert bit to each restoration message;
   b. identifying, at each intermediate node of said network, said restoration message by reading said router alert bit;
   c. in response to said step of identifying, duplicating said restoration message;
   d. sending a copy of said restoration message to an application layer of said node for local processing; and
   e. forwarding another copy of said restoration message, through a shim layer of said node, directly to a next node in said network.

2. The method of claim 1 wherein said step of attaching comprises placing a label special value in each packet representing said restoration message.

3. The method of claim 2 wherein said special value is 1.

4. The method of claim 2 wherein said special value is placed at a top of a stack of said each packet.

5. The method of claim 1 wherein said step of identifying is carried out by a Label Switched Router at said each intermediate node.

6. The method of claim 5 wherein said Label Switched Router identifies said restoration message by reading said router alert bit.

7. The method of claim 1 wherein said step of sending comprises sending said one copy of restoration message to a local queue at said application layer.

8. The method of claim 1 further comprising a step, after said step of sending, of processing said one copy of restoration message at said application layer.

9. The method of claim 8 wherein said step of processing comprises processing said packet according to standards if said router alert bit in an IP header of said packet is set.

10. The method of claim 9 wherein said step of processing further comprises, if said router alert bit in said IP header of said packet is not set, checking a data portion of said message to see if it is a dual action message, and if so, turning said message over to a specific application for processing.

11. The method of claim 10 wherein said step of processing further comprises a step of discarding said message if said message is not a dual action message.

12. The method of claim 1 wherein said one copy of said restoration message is a duplicated one of said restoration message, while said another copy of said restoration message is an original one of said restoration message.

* * * * *